United States Patent
Imanishi et al.

(10) Patent No.: US 10,155,447 B2
(45) Date of Patent: Dec. 18, 2018

(54) DRIVE CONTROL DEVICE OF MOVING BODY

(71) Applicant: Hitachi Automotive Systems, Ltd., Hitachinaka-shi, Ibaraki (JP)

(72) Inventors: Yuto Imanishi, Tokyo (JP); Atsushi Yokoyama, Tokyo (JP); Taisetsu Tanimichi, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 39 days.

(21) Appl. No.: 15/039,720

(22) PCT Filed: Nov. 12, 2014

(86) PCT No.: PCT/JP2014/079911
§ 371 (c)(1),
(2) Date: May 26, 2016

(87) PCT Pub. No.: WO2015/079910
PCT Pub. Date: Jun. 4, 2015

(65) Prior Publication Data
US 2016/0375775 A1    Dec. 29, 2016

(30) Foreign Application Priority Data
Nov. 26, 2013  (JP) .................... 2013-243455

(51) Int. Cl.
*B60L 7/18*    (2006.01)
*B60L 7/26*    (2006.01)
(Continued)

(52) U.S. Cl.
CPC .............. *B60L 7/26* (2013.01); *B60L 7/10* (2013.01); *B60L 7/18* (2013.01); *B60L 7/24* (2013.01);
(Continued)

(58) Field of Classification Search
CPC ............ B60T 13/00; B60T 15/00; B60L 7/18; B60L 7/26
(Continued)

(56) References Cited

U.S. PATENT DOCUMENTS

2011/0049969 A1* 3/2011 Park ..................... B60T 1/10
303/3
2011/0246012 A1* 10/2011 McClain ................ B60L 7/18
701/22

(Continued)

FOREIGN PATENT DOCUMENTS

JP    6-165304 A    6/1994
JP    9-37407 A     2/1997
(Continued)

OTHER PUBLICATIONS

International Search Report (PCT/ISA/210) issued in PCT Application No. PCT/JP2014/079911 dated Jan. 6, 2015 with English translation (5 pages).

(Continued)

*Primary Examiner* — Thomas G Black
*Assistant Examiner* — Wae L Louie
(74) *Attorney, Agent, or Firm* — Crowell & Moring LLP

(57) ABSTRACT

To provide a drive control device of a moving body capable of increasing a regeneration amount without hindering a driver's brake operation and causing too much deceleration. A drive control device of a moving body that updates a regenerative pattern of a driving motor of the moving body including a brake that generates a braking force by being linked to an operation amount of a brake pedal, the drive control device including an external world information acquisition unit that acquires external world information and a brake detector that detects ON/OFF of the brake, wherein when the brake detector detects ON, the regenerative pattern (Continued)

is changed based on the external world information acquired by the external world information acquisition unit such that a braking distance only decreases.

10 Claims, 11 Drawing Sheets

(51) Int. Cl.
    *B60T 1/10*           (2006.01)
    *B60T 13/58*         (2006.01)
    *B60L 7/10*           (2006.01)
    *B60L 7/24*           (2006.01)
    *B60W 30/18*        (2012.01)

(52) U.S. Cl.
    CPC .............. *B60T 1/10* (2013.01); *B60T 13/585* (2013.01); *B60W 30/18127* (2013.01); *B60L 2240/10* (2013.01); *B60L 2240/70* (2013.01); *B60L 2250/26* (2013.01); *B60T 2270/604* (2013.01); *Y02T 10/7291* (2013.01); *Y02T 90/16* (2013.01)

(58) Field of Classification Search
    USPC ..... 180/169, 65.24, 65.51; 303/113.2, 116.4; 701/70
    See application file for complete search history.

(56) References Cited

U.S. PATENT DOCUMENTS

| | | | | |
|---|---|---|---|---|
| 2012/0212161 A1* | 8/2012 | Takeuchi | .................. | H02P 6/24 318/376 |
| 2013/0090822 A1* | 4/2013 | Schwindt | ........... | B60K 31/0008 701/70 |
| 2013/0162009 A1* | 6/2013 | Mitts | ........................ | B60L 3/102 303/3 |
| 2014/0008966 A1* | 1/2014 | Hotani | .................. | B60T 8/4081 303/14 |
| 2014/0285331 A1* | 9/2014 | Otake | ........................ | G08G 1/16 340/435 |
| 2015/0183433 A1* | 7/2015 | Suzuki | .................. | B60W 30/16 701/96 |
| 2016/0375775 A1* | 12/2016 | Imanishi | .................. | B60T 1/10 701/70 |
| 2017/0259671 A1* | 9/2017 | Kim | ........................ | B60L 7/26 |

FOREIGN PATENT DOCUMENTS

| | | |
|---|---|---|
| JP | 9-166209 A | 6/1997 |
| JP | 2005-39908 A | 2/2005 |
| JP | 2007-129827 A | 5/2007 |
| JP | 2009-29388 A | 2/2009 |
| JP | 2010-4670 A | 1/2010 |

OTHER PUBLICATIONS

Japanese-language Written Opinion (PCT/ISA/237) issued in PCT Application No. PCT/JP2014/079911 dated Jan. 6, 2015 (3 pages).

Extended European Search Report issued in counterpart European Patent Application No. 14865696.0 dated Jun. 22, 2017 (Ten (10) pages).

English-language translation of Chinese-language Office Action issued in counterpart Chinese Application No. 201480064428.0 dated Jun. 21, 2017 (3 pages).

European Office Action issued in counterpart European Patent Application No. 14 865 696.0 dated Dec. 22, 2017 (Seven (7) pages).

English translation of Chinese-language Office Action issue in counterpart Chinese application No. 201480064428.0 dated Dec. 4, 2017 (8 pages).

\* cited by examiner

DRIVE CONTROL DEVICE OF MOVING BODY

TECHNICAL FIELD

The present invention relates to a method of regenerative control using an external recognition sensor of a motor vehicle.

BACKGROUND ART

In recent years, motor vehicles that travel by wheels being driven by a motor and/or an engine have been developed.

Such a motor vehicle is accelerated by torque of an engine being assisted by a motor or the motor alone during acceleration and recovers energy by generating power using the motor during deceleration.

Accordingly, energy efficiency can be improved by assisting torque using the motor or using the motor alone in an area where energy efficiency of the engine is low and energy recovered during deceleration can be used for acceleration so that fuel efficiency can be improved.

In addition, automatic braking control and automobile speed control devices using an external recognition sensor to soften the impact during collision and reduce driver's driving loads have been proposed.

Such an automatic braking control device can automatically decelerate by detecting the distance from the vehicle to an obstacle and a relative speed therebetween through the external recognition sensor and calculating appropriate timing from the detection results.

In the meantime, for example, in the invention described in PTL1, a target driving force is determined based on the vehicle speed, accelerator releasing speed, road gradient, vehicle weight, relative physical relation with a forward obstacle, road surface friction coefficient and the like immediately before the accelerator is released and regenerative braking is controlled based on the target braking force.

CITATION LIST

Patent Literature

PTL1: JP 9-037407 A

SUMMARY OF INVENTION

Technical Problem

However, the braking force of a vehicle changes depending on the road surface friction coefficient and road gradient on a traveling route, the vehicle weight and the like. Thus, it is difficult to determine an appropriate regenerative braking force from conditions immediately before the accelerator is released. If, for example, the regenerative braking force is too strong, the vehicle is stopped unnecessarily by too much deceleration and the driver feels uncomfortable. In addition, the driver operates the accelerator to try to accelerate the vehicle, leading to fuel inefficiency. If the regenerative braking force is weak and deceleration of the vehicle is small, the driver operates the brake pedal to try to decelerate the vehicle. In a vehicle in which a friction brake is applied by being linked to a brake pedal, the braking force by the friction brake increases with an operation amount of the brake pedal, leading to increasing energy losses and fuel inefficiency. Therefore, it is desirable to increase the regenerative braking force without decelerating too much and after the accelerator is released, to continue to update the regenerative braking force based on external world information acquired by an external recognition sensor while the brake pedal is operated to improve fuel efficiency. However, if the regenerative braking force changes while the driver operates the brake pedal, a problem of the brake operation by the driver being hindered by changes of the regenerative braking force arises.

Solution to Problem

A drive control device of a moving body according to the present invention is a drive control device of a moving body that updates a regenerative pattern of a driving motor of the moving body including a brake that generates a braking force by being linked to an operation amount of a brake pedal, the drive control device including an external world information acquisition unit that acquires external world information and a brake detector that detects ON/OFF of the brake, wherein when the brake detector detects ON, the regenerative pattern is changed based on the external world information acquired by the external world information acquisition unit such that a braking distance only decreases.

Advantageous Effects of Invention

According to the present invention, the regeneration amount can be increased without hindering a driver's brake operation and causing too much deceleration.

DESCRIPTION OF EMBODIMENTS

Hereinafter, the embodiments to carry out the present invention will be described with reference to the drawings. In the embodiments described below, the present invention is described by taking a case when applied to a drive system of an electric vehicle in which a motor is the only power source of the vehicle as an example, but the present invention can also be applied to the control device of motor vehicles of rolling stock, construction vehicles and the like and motor vehicles in which an engine as an internal combustion engine and a motor are used as power sources of the vehicle, for example, hybrid vehicles (passenger cars), freight vehicles such as hybrid trucks, and buses such as hybrid buses.

First Embodiment

Figure 1:
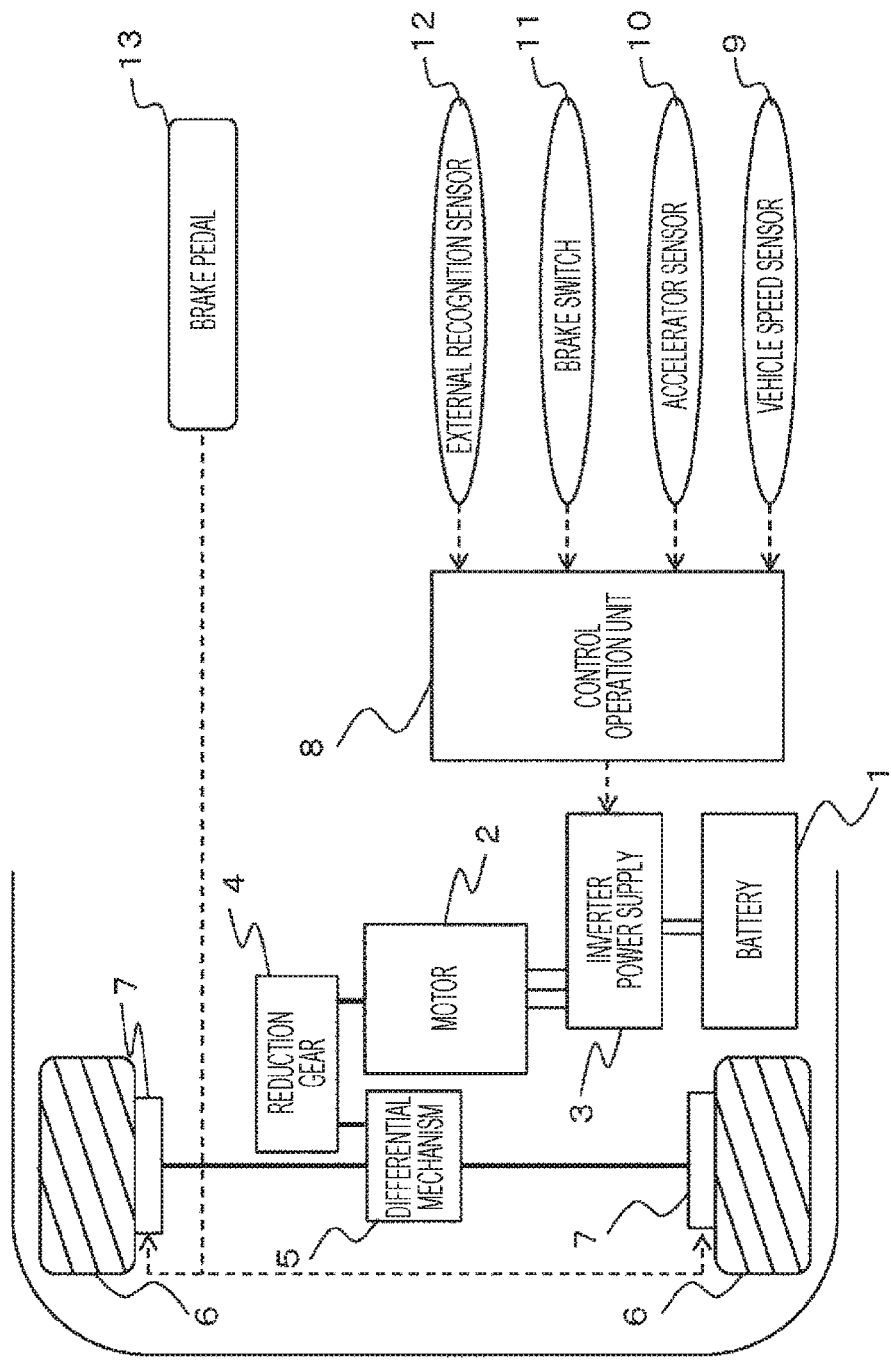
FIG. 1 is a diagram showing an outline configuration of a drive control device according to a first embodiment.

FIG. 1 is a diagram showing the configuration of a drive control device of an electric vehicle in the first embodiment. Broken line arrows in FIG. 1 show the flow of signals. The vehicle includes a battery 1 as an energy source of the vehicle, a motor 2 to electrically drive the vehicle, an inverter power supply 3 to make a power conversion between the battery 1 and the motor 2, and the control operation unit 8 to control the inverter power supply 3, a braking device 7 and the like.

The inverter power supply 3 converts a direct current supplied from the battery 1 into a three-phase alternating current by pulse width modulation (PWM) and supplies the alternating current to the motor 2. The motor 2 converts electric energy supplied as a three-phase alternating current from the inverter power supply 3 into kinetic energy. Power generated by the motor 2 as kinetic energy is transmitted to a reduction gear 4 and decelerated by a deceleration mechanism inside the reduction gear 4 and then transmitted left and right driving wheels 6 via a differential mechanism 5 to become a driving force to drive the vehicle. In addition, kinetic energy of the vehicle is converted into electric energy by causing the motor 2 to perform a regenerative operation so that the electric energy can be recovered to the battery 1. The recovered electric energy can be converted into kinetic energy again and thus, fuel efficiency of the vehicle can be improved by causing the motor 2 to perform a regenerative operation.

The braking device 7 that generates a braking force of the vehicle in accordance with an operation amount of a brake pedal 13 is provided near the driving wheel 6. The braking device 7 includes a hydraulic booster and a frictional force is generated by pressing the driving wheel 6 by a hydraulic operating force generated by the hydraulic booster. Accordingly, kinetic energy is converted into thermal energy to brake the vehicle.

In FIG. 1, the control operation unit 8 is comprised of CPU, a memory and the like and controls the motor 2 by executing a control program. The control operation unit 8 can change torque generated by the motor 2 and regenerated power charged in the battery 1 by sending a command to the inverter power supply 3 to change the magnitude of current passed to the motor 2 or the frequency of an alternating current.

As shown in FIG. 1, a vehicle speed sensor 9 to detect the vehicle speed, an accelerator sensor 10 to detect an accelerator pedal opening (operation amount of the accelerator pedal), a brake switch 11 to detect ON/OFF of the brake pedal 13, and an external recognition sensor 12 to acquire external world information are connected to the control operation unit 8. The external recognition sensor 12 can detect the type of a deceleration object of the vehicle, the relative distance, and the relative speed as external world information.

To detect a braking force generated by the braking device 7, an expensive sensor such as a stepping force sensor of the brake pedal is needed. In the embodiments of the present invention, a sensor to detect a braking force generated by the braking device 7 or the like is not provided to reduce the system cost.

Figure 2:
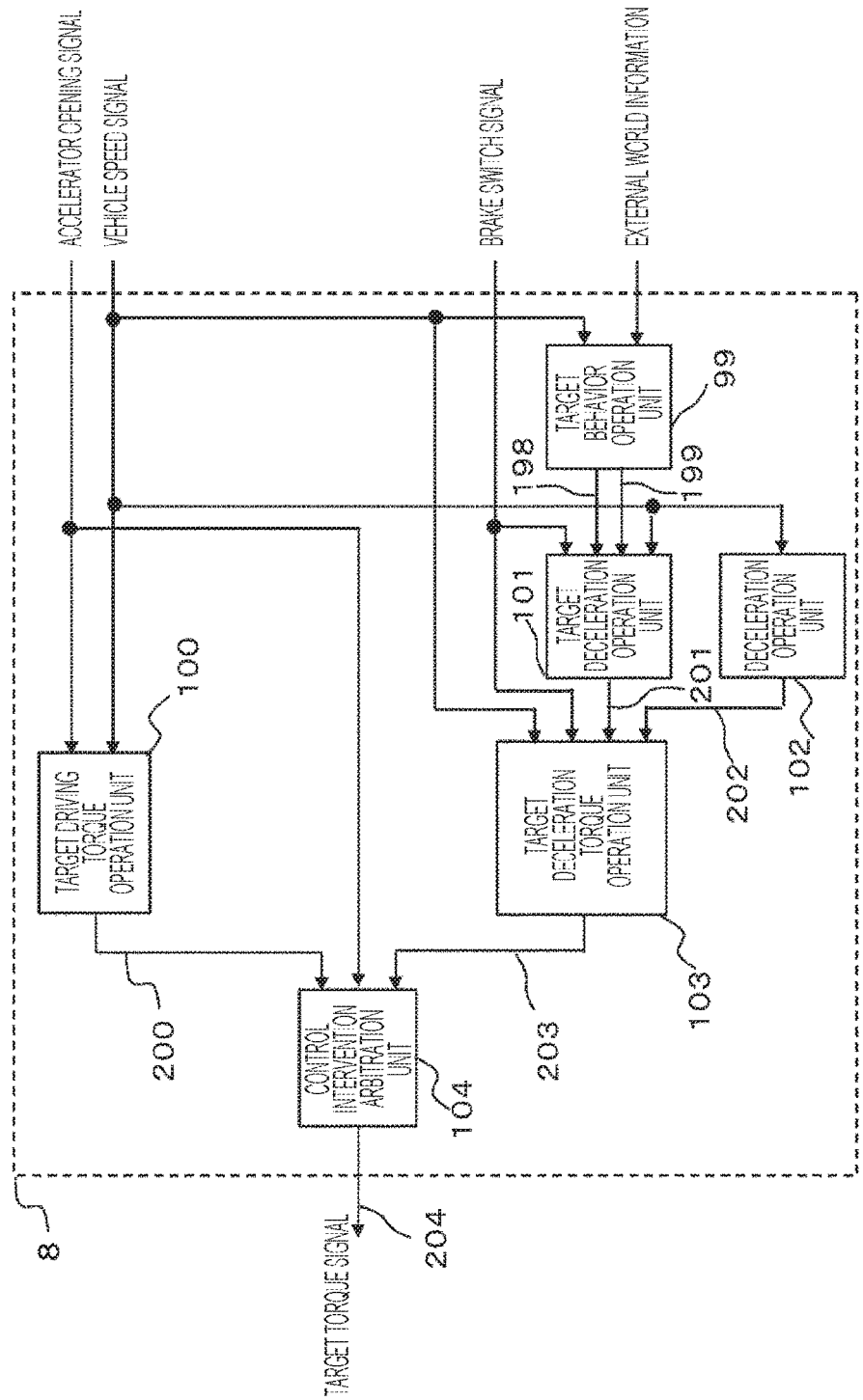
FIG. 2 is a block diagram of a control operation unit 8 according to the first embodiment.

Next, the configuration of the control operation unit 8 will be described using FIG. 2. A target driving torque operation unit 100 calculates the target torque of the motor 2, that is, the target driving torque when there is no intervention of deceleration control after a vehicle speed signal is input from the vehicle speed sensor 9 and an accelerator opening signal is input from the accelerator sensor 10. The accelerator opening of the accelerator pedal is proportional to an output request and thus, the accelerator opening is converted into an output request and divided by the vehicle speed to calculate a driving force request of the vehicle, that is, the target driving torque of the motor 2.

A target behavior operation unit 99 calculates a target distance 198 and a target speed 199 at the target distance 198 after a vehicle speed signal is input from the vehicle speed sensor 9 and the type of a deceleration object, the relative distance, and the relative speed are input from the external recognition sensor 12 as external world information. Correspondences from the relative distance, relative speed, and vehicle speed of the deceleration object to the target distance 198 and the target speed 199 are stored in a memory provided in the control operation unit 8 as a numerical map for each type of the deceleration object.

The target deceleration operation unit 101 calculates the intended deceleration, that is, target deceleration 201 when there is an intervention of deceleration control after a brake switch signal is input from the brake switch 11, the target distance 198 and the target speed 199 are input from the target behavior operation unit 99, and a vehicle speed signal is input from the vehicle speed sensor 9.

A deceleration operation unit 102 calculates deceleration 202 of the vehicle by a difference calculation after a vehicle speed signal is input from the vehicle speed sensor 9.

The target deceleration torque operation unit 103 calculates target deceleration torque 203 to match the deceleration 202 calculated by the deceleration operation unit 102 to the target deceleration 201 calculated by the target deceleration operation unit 101 when there is an intervention of deceleration control after a vehicle speed signal is input from the vehicle speed sensor 9, a brake switch signal is input from the brake switch 11, the target deceleration 201 is input from the target deceleration operation unit, and the deceleration 202 is input from the deceleration operation unit 102.

A control intervention arbitration unit 104 determines whether to allow an intervention of deceleration control after an accelerator opening signal is input from the accelerator sensor 10, target driving torque 200 is input from the target driving torque operation unit 100, and the target deceleration torque 203 is input from the target deceleration torque operation unit 103. If the accelerator opening signal is equal to a predetermined value or less, the control intervention arbitration unit 104 determines to allow an intervention and sends the target deceleration torque 203 to the inverter power supply 3 as target torque 204. If the accelerator opening signal is equal to a predetermined value or more, the control intervention arbitration unit 104 determines to not allow an intervention and sends the target driving torque 200 to the inverter power supply 3 as the target torque 204.

The target torque 204 is sent to the inverter power supply 3 and torque control is performed so that the torque is generated.

Figure 3:
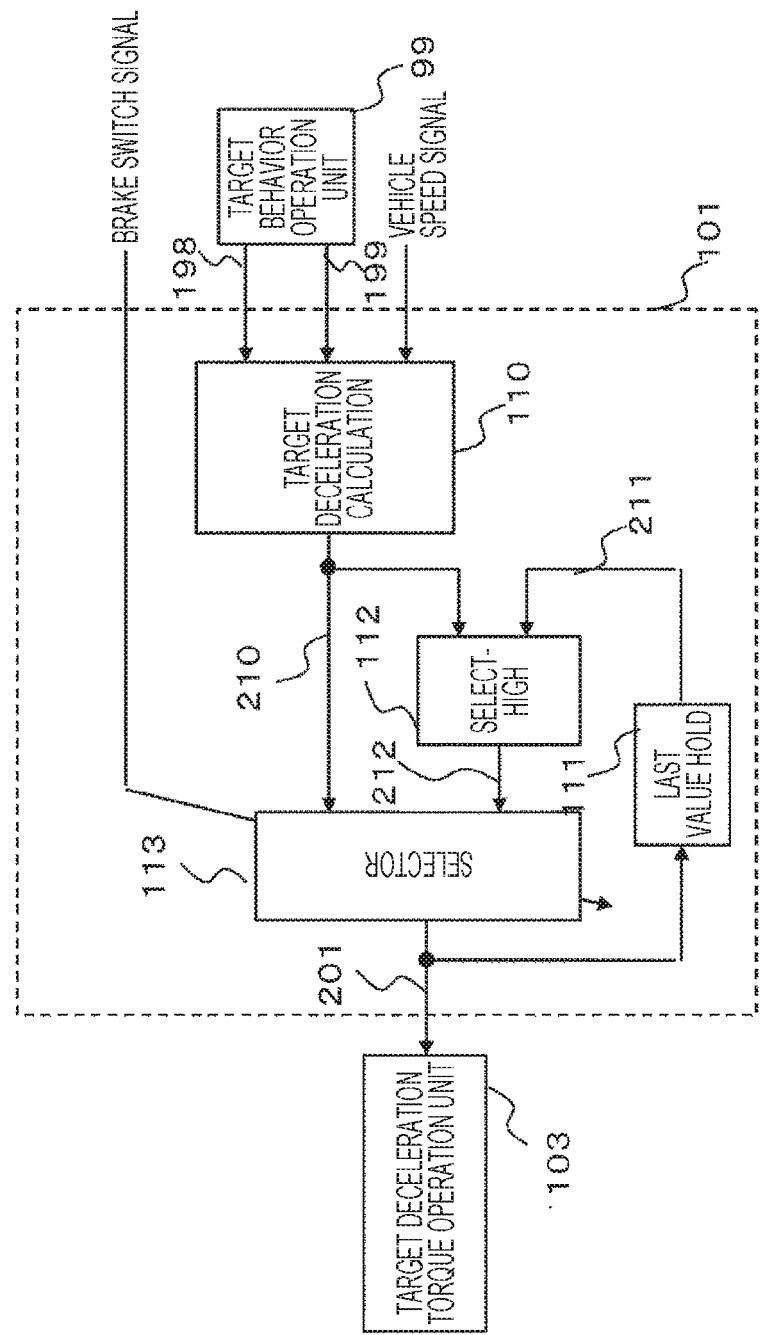
FIG. 3 is a block diagram of a target deceleration operation unit 101 according to the first embodiment.

Next, the target deceleration operation unit 101 will be described using FIG. 3.

In the target deceleration operation unit 101, a target deceleration calculation 110 determines a target deceleration base value 210 (Gb) from the target distance 198 (Lr), the target speed 199 (Vr), and the vehicle speed signal (V) input from the target behavior operation unit 99 as Gb=$(V^2-Vr^2)/(2Lr)$. The target deceleration base value 210 (Gb) is deceleration to reach the target speed 199 (Vr) from the vehicle speed signal (V) after traveling the target distance 198 (Lr). Therefore, a braking distance of the vehicle decreases as the target deceleration base value 210 (Gb) increases. Here, the braking distance is a travel distance needed for the vehicle speed to be decelerated to a predetermined value.

A last value hold 111 calculates a target deceleration last value 211 as the last value of the target deceleration 201.

A select-high 112 selects the larger of the target deceleration base value 210 (Gb) input from the target deceleration calculation 110 and the target deceleration last value 211 input from the last value hold 111 to calculate a target deceleration change direction limiting value 212. Thus, the braking distance by the target deceleration change direction limiting value 212 is always shorter than the braking distance when the last value of the target deceleration 201 is used.

A selector 113 outputs the target deceleration base value 210 as the target deceleration 201 when a brake switch signal is OFF and the target deceleration change direction limiting value 212 as the target deceleration 201 when the brake switch signal is ON after the brake switch signal is input from the brake switch 11, the target deceleration base value 210 is input from the target deceleration calculation 110, and the target deceleration change direction limiting value 212 is input from the select-high 112. When the brake switch is ON, the target deceleration 201 changes such that the braking distance only decreases.

As described above, the target deceleration 201 changes such that the braking distance only decreases when the brake switch is ON and thus, changes of the target deceleration 201 do not hinder the driver's brake operation.

Figure 4:
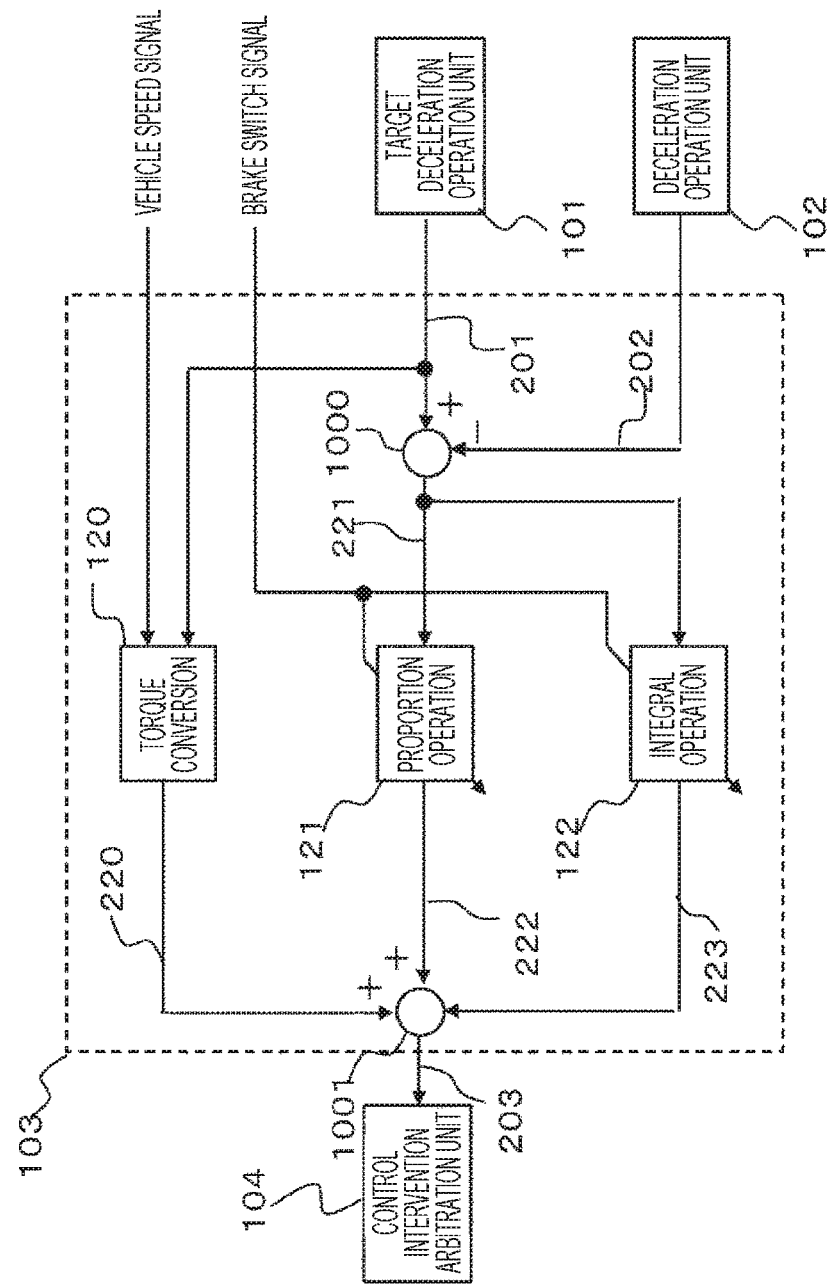
FIG. 4 is a block diagram of a target deceleration torque operation unit 103 according to the first embodiment.

Next, the target deceleration torque operation unit 103 will be described using FIG. 4.

In the target deceleration torque operation unit 103, a torque converter 120 calculates a target deceleration torque base value 220 (Tb) from the vehicle speed signal (V) input from the vehicle speed sensor 9 and the target deceleration 201 (Gr) input from the target deceleration operation unit 101 as Tb=$\{M \cdot Gr + M \cdot g \cdot \mu + (\rho \cdot Cd \cdot A \cdot V^2)/2\} \cdot R/\eta$. where M is the estimated value of the vehicle weight, g is the gravitational acceleration, μ is the estimated value of the rolling resistance coefficient, ρ is the air density, Cd is the estimated value of a Cd value, A is the frontal projected area, R is the radius of a vehicle wheel, and r is the reduction ratio from a motor shaft to an axle.

A difference between the target deceleration 201 input from the target deceleration operation unit 101 and the deceleration 202 input from the deceleration operation unit 102 is found at 1000 to calculate a deceleration deviation 221.

A proportion operation 121 calculates a proportion correction value 222 by multiplying the deceleration deviation 221 by a constant when a brake switch signal input from the brake switch 11 is OFF. When the brake switch signal is ON, the last value of the proportion correction value 222 is output as the proportion correction value 222.

An integral operation 122 calculates an integral correction value 223 by multiplying an integrated value of the deceleration deviation 221 by a constant when a brake switch signal input from the brake switch 11 is OFF. When the brake switch is ON, the last value of the integral correction value 223 is output as the integral correction value 223. At 1001, the sum of the target deceleration torque base value 220, the proportion correction value 222, and the integral correction value 223 is calculated to set the sum as the target deceleration torque 203.

By adding the proportion correction value 222 and the integral correction value 223 to the target deceleration torque base value 220 as described above, the deceleration 202 of the vehicle can be matched to the target deceleration 201 so that the speed at the target distance 198 is the target speed 199. Accordingly, fuel efficiency of the vehicle can be improved by increasing the regeneration amount without decelerating too much. When the brake switch is ON as described above, the last values are used as the proportion correction value 222 and the integral correction value 223 and thus, the braking distance decreases for the target deceleration torque 203. Therefore, changes of the target deceleration torque 203 do not hinder the driver's brake operation.

Effects of the present embodiment will be described using FIGS. 5, 6, and 7.

Figure 5:
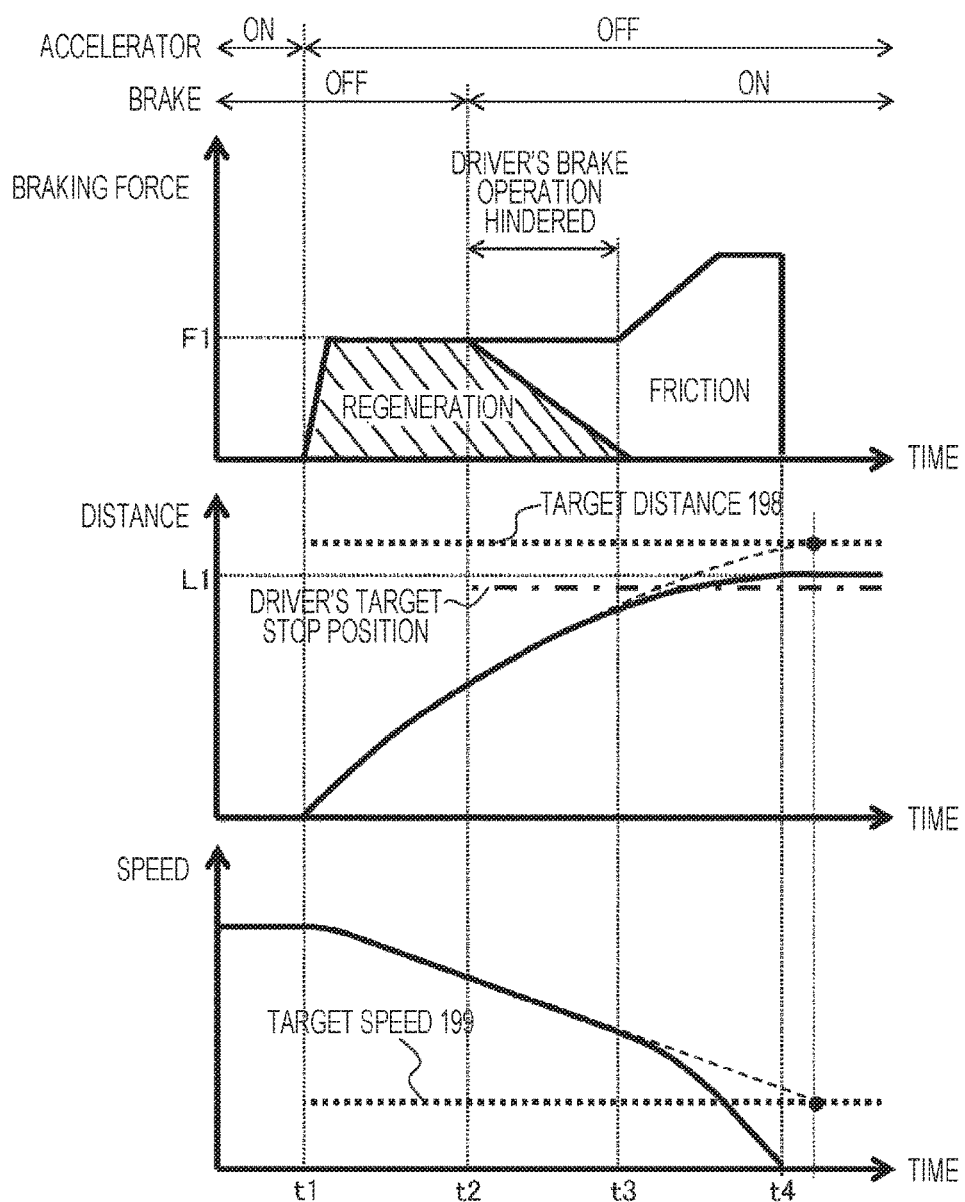
FIG. 5 is a diagram illustrating an operation example of the drive device when the present invention in the first embodiment is not used.

FIG. 5 is a diagram illustrating an operation when the present embodiment is not used, that is, when the brake is ON, the regenerative pattern is not changed such that the braking distance only decreases. When the driver releases the accelerator at time t1, the drive device increases the braking force using regeneration up to F1 so that the speed at the target distance 198 is decelerated to the target speed 199 based on external world information. When the driver steps on the brake to increase deceleration at time t2, a braking force by the friction brake is generated. However, the drive device determines that the deceleration by the friction brake is too much and decreases the braking force using regeneration so that the speed at the target distance 198 is the target speed 199. As a result, in the time between time t2 and time t3, the braking force does not change in response to the driver's brake operation so that the drive device hinders the driver's brake operation. Therefore, a stop position L1 at time t4 exceeds the driver's target stop position.

Figure 6:
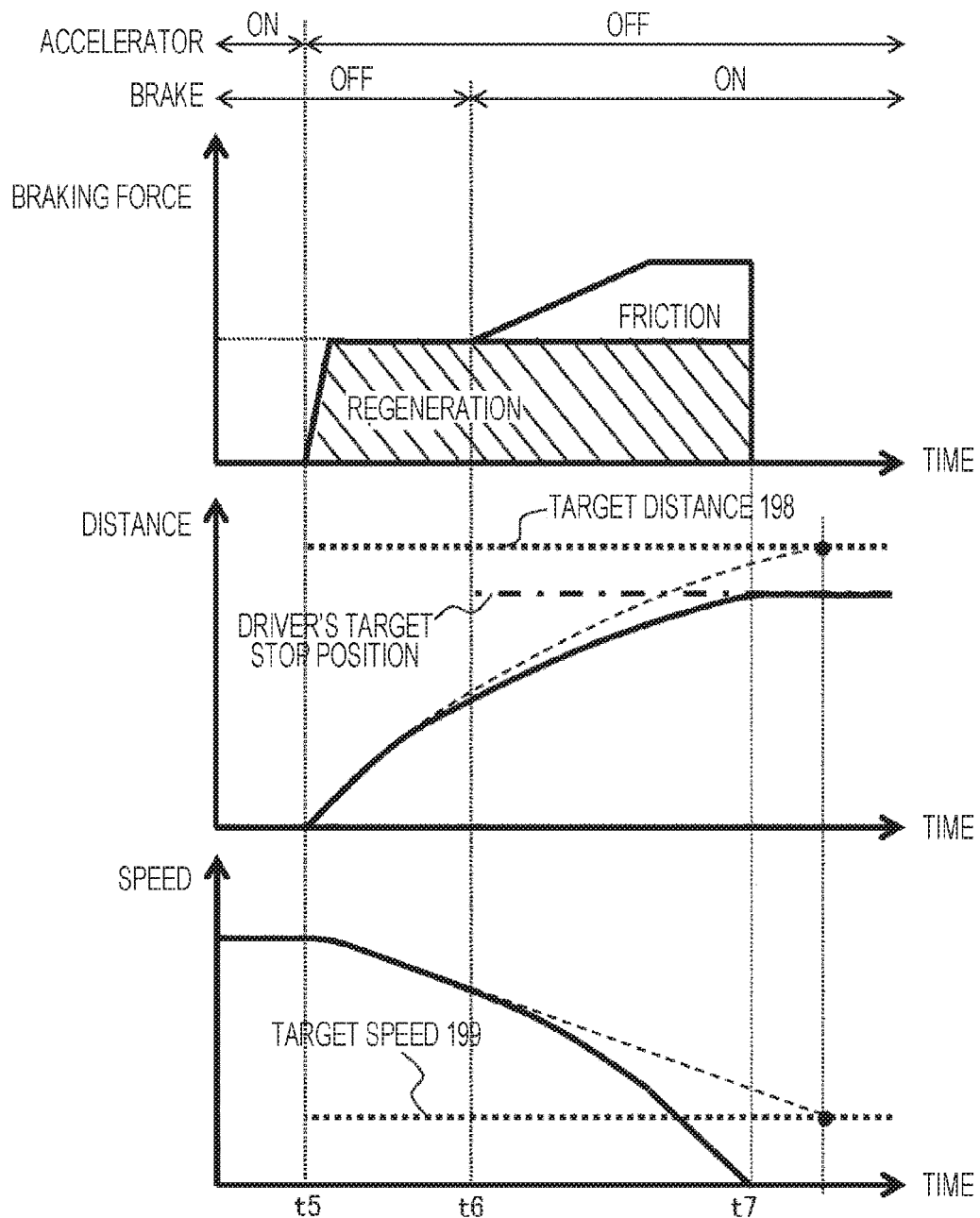
FIG. 6 is a diagram illustrating an operation example of the drive device according to the first embodiment.

FIG. 6 is a diagram illustrating an operation when the present embodiment is used, that is, when the brake is ON, the regenerative pattern is changed such that the braking distance only decreases. When the driver releases the accelerator at time t5, the drive device according to the present embodiment increases the braking force using regeneration up to F2 such that the speed at the target distance 198 is decelerated to the target speed 199 based on external world information. Accordingly, fuel efficiency can be improved. When the driver steps on the brake to increase deceleration at time t6, a braking force by the friction brake is generated. At this point, it is necessary to change the regenerative pattern such that the braking distance increases to match the speed at the target distance 198 to the target speed 199, but the brake is ON and the drive device according to the present embodiment does not change the regenerative pattern. Thus, in the time between time t6 and time t7, the braking force can be changed by reflecting the driver's brake operation. Accordingly, the stop position at time t7 can be selected as the driver's target stop position.

Figure 7:
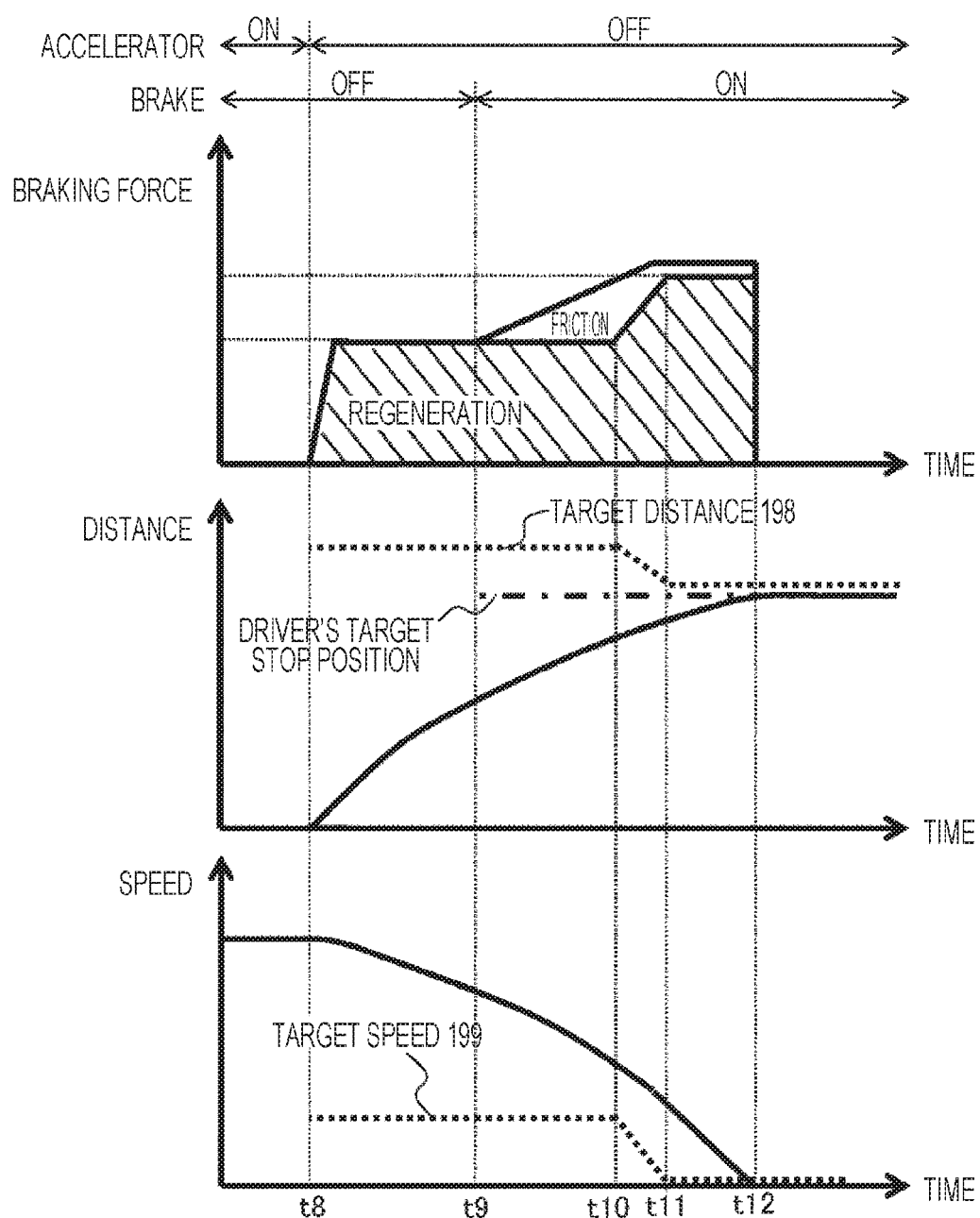
FIG. 7 is a diagram illustrating an operation example of the drive device according to the first embodiment.

FIG. 7 is a diagram illustrating an operation when the brake is ON and the regenerative pattern is changed such that the braking distance only decreases and also from time t10 onward, the target distance 198 and the target speed 199 approach the driver's intention. When the driver releases the accelerator at time t9, the drive device according to the present embodiment increases the braking force using regeneration up to F3 such that the speed at the target distance 198 is decelerated to the target speed 199 based on external world information. Accordingly, fuel efficiency can be improved. When the driver steps on the brake to increase deceleration at time t9, a braking force by the friction brake is generated. At this point, it is necessary to change the regenerative pattern such that the braking distance increases to match the speed at the target distance 198 to the target speed 199, but the brake is ON and the drive device according to the present embodiment does not change the regenerative pattern. Thus, in the time between time t9 and time t10, the braking force can be changed by reflecting the driver's brake operation. If the target distance 198 and the target speed 199 change as shown in FIG. 7 from time t10 to time t11, the drive device according to the present embodiment changes the regenerative pattern to match the speed at the target distance 198 to the target speed 199. While the brake is ON from time t10 to time t11, the regenerative pattern needs to be changed such that the braking distance decreases to match the speed at the target distance 198 to the target speed 199 and therefore, the braking force using regeneration is changed up to F4. The driver always fine-tunes the brake operation so as to stop the vehicle in the driver's target stop position. The target distance 198 and the target speed 199 change from time t10 to time t11 and thus, the driver eases up on the brake operation to stop the vehicle in the target stop position. As a result, the braking force by the friction brake is decreased and the braking force using regeneration can be increased and therefore, fuel efficiency can further be improved. Also, the stop position at time t12 can be selected as the driver's target stop position.

The external recognition sensor 12 may be any sensor capable of detecting the distance to an object in front of the local vehicle such as a laser radar, a radar, and a stereo camera and in the present embodiment, a stereo camera is used as the external recognition sensor 12.

The stereo camera used as the external recognition sensor 12 in the present embodiment can detect a preceding vehicle as a deceleration object. Thus, when decelerated with respect to the preceding vehicle, fuel efficiency can be improved by increasing the regeneration amount.

Figure 8:
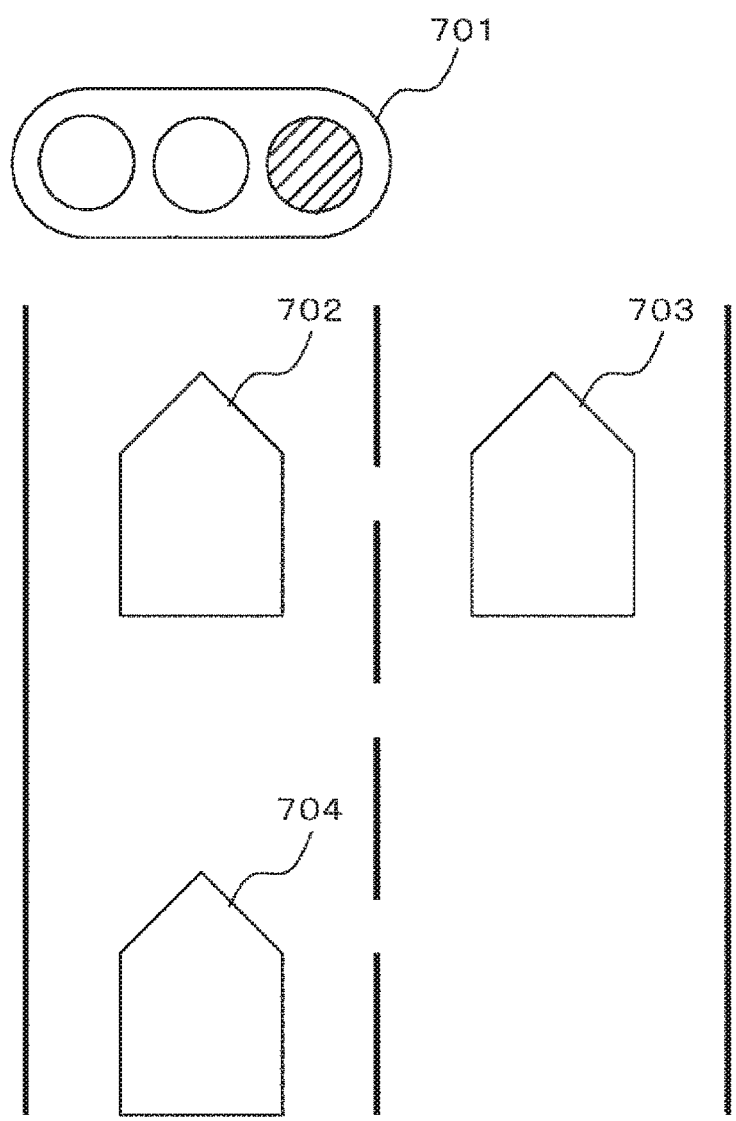
FIG. 8 is an image diagram when vehicles stop in front at a red signal in the first embodiment.

In a situation shown in FIG. 8 in which a signal 701 is red and vehicles 702, 703 stop in front, a laser radar or a radar cannot determine whether the vehicles 702, 703 that stop or a wall that happens to appear in front until the distance to a local vehicle 704 becomes short and so cannot determine to increase regeneration sufficiently in advance.

However, a stereo camera can determine that an object present before is a vehicle based on the color and shape of a vehicle and the distance to the recognized object can be detected from the time when the object is far away so that the regeneration amount can be increased.

The stereo camera used as the external recognition sensor 12 in the present embodiment can detect a curve on a traveling route as a deceleration object. Thus, when decelerated with respect to a curve on the traveling route, fuel efficiency can be improved by increasing the regeneration amount.

The stereo camera used as the external recognition sensor 12 in the present embodiment can detect a width decreased portion on the traveling route as a deceleration object. Thus, when decelerated with respect to a width decreased portion on the traveling route, fuel efficiency can be improved by increasing the regeneration amount.

In addition, using a map of a navigation system jointly as the external recognition sensor 12 can be considered. By using a map of a navigation system jointly, the external recognition sensor 12 in the present embodiment can detect a red signal stop line on the traveling route. Thus, when decelerated with respect to a red signal stop line on the traveling route, fuel efficiency can be improved by increasing the regeneration amount.

Figure 9:
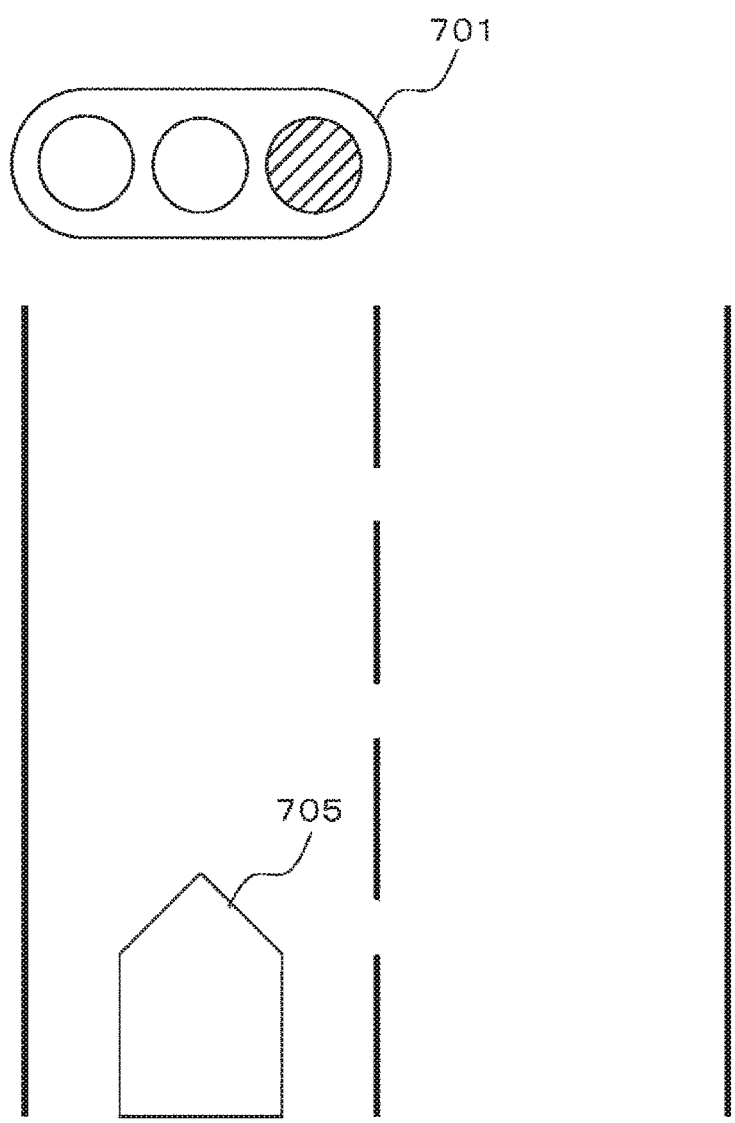
FIG. 9 is an image diagram when entering a red signal while there is no vehicle in front in the first embodiment.

When, as shown in FIG. 9, there is no object in front of a local vehicle 705, the regeneration amount cannot be increased by using a laser radar or a radar. In such a case, the regeneration amount can be increased even in a situation as shown in FIG. 9 by detecting a red signal using a stereo camera and calculating the distance to a stop line from a map.

By using a map of a navigation system jointly, the external recognition sensor 12 in the present embodiment can detect a tollgate on the traveling route. Thus, when decelerated with respect to a tollgate on the traveling route, fuel efficiency can be improved by increasing the regeneration amount.

By using a map of a navigation system jointly, the external recognition sensor 12 in the present embodiment can detect a downhill grade on the traveling route. Thus, when decelerated with respect to a downhill grade on the traveling route, fuel efficiency can be improved by increasing the regeneration amount.

Second Embodiment

Figure 10:
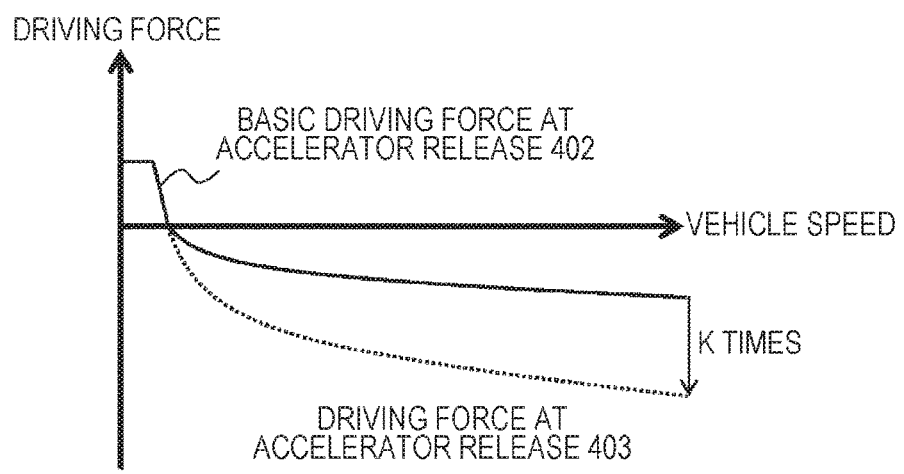
FIG. 10 is a diagram showing a driving force when the accelerator is released in a second embodiment.
Figure 11:
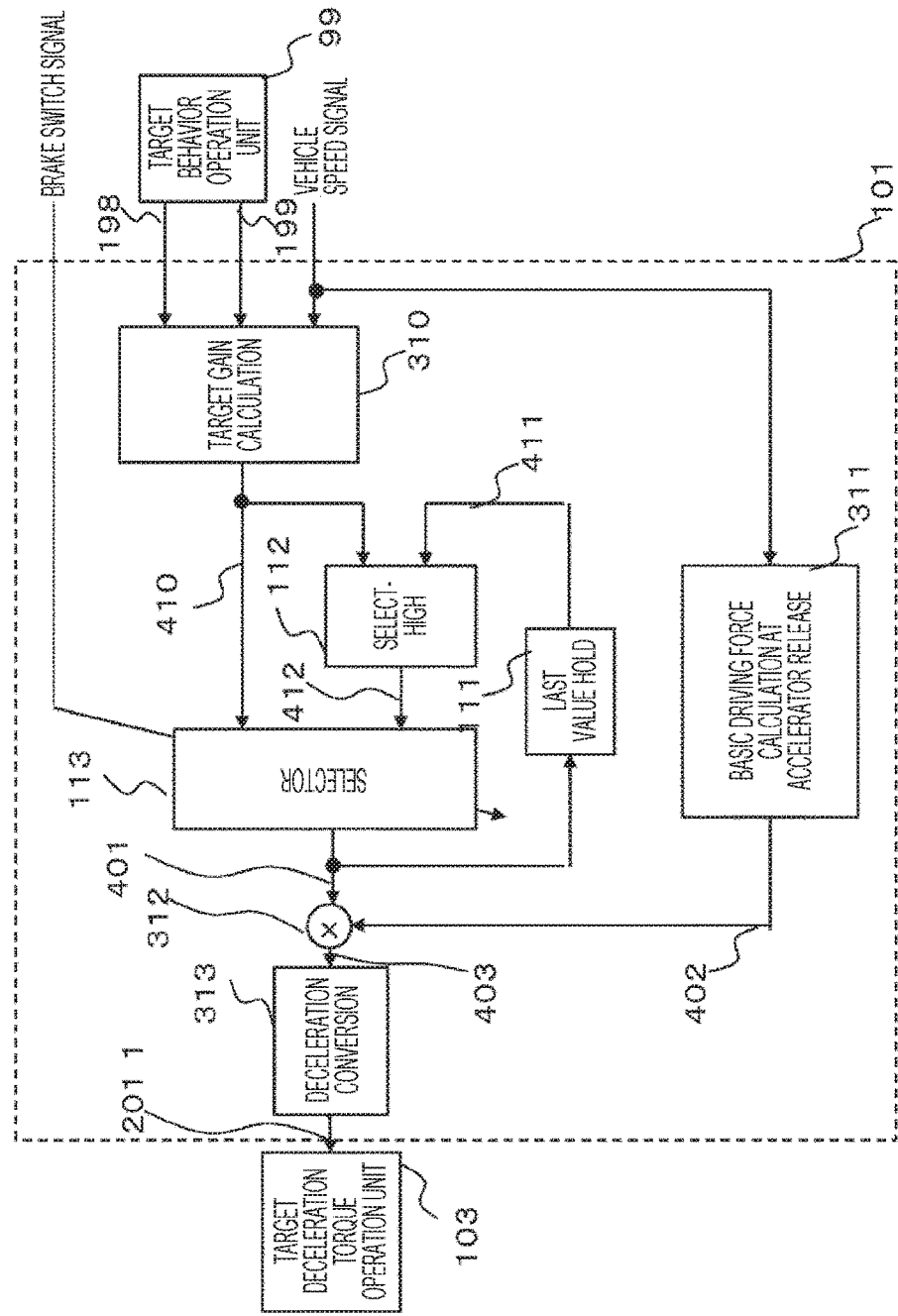
FIG. 11 is a diagram showing a block diagram of the target deceleration operation unit 101 according to the second embodiment.

FIG. 10 is a diagram showing a driving force when the accelerator is released in the second embodiment of the present invention and FIG. 11 is a diagram showing a block diagram of the target deceleration operation unit 101 in the second embodiment of the present invention. The second embodiment is a modification of a portion of the configuration (configuration of the target driving torque operation unit 100 and the target deceleration operation unit 101) of the first embodiment described above. The same reference signs are attached to elements similar to those shown in FIGS. 1 and 2 and the description below focuses on differences.

The target driving torque operation unit 100 calculates the target torque of the motor 2, that is, the target driving torque when there is no intervention of deceleration control after a vehicle speed signal is input from the vehicle speed sensor 9 and an accelerator opening signal is input from the accelerator sensor 10. The accelerator opening of the accelerator pedal is proportional to an output request and thus, the accelerator opening is converted into an output request, divided by the vehicle speed, and a basic driving force at accelerator release 403 being added to calculate a driving force request of the vehicle, that is, the target driving torque of the motor 2.

FIG. 10 is a diagram showing the driving force when the accelerator is released. When the vehicle speed is equal to a predetermined value or less, the driving force is a positive value corresponding to a creep. When the vehicle speed is equal to the predetermined value or more, the driving force is negative.

In the target deceleration operation unit 101 according to the second embodiment, a target gain calculation 310 determines a target gain base value 410 from the target distance 198 (Lr), the target speed 199 (Vr), and the vehicle speed signal (V) input from the target behavior operation unit 99. The target gain base value 410 is multiplied by a basic driving force at accelerator release 402 to be used for calculating the driving force at accelerator release 403. The target gain base value 410 is a value to achieve the target speed 199 (Vr) after traveling the target distance 198 (Lr) if decelerated by the driving force at accelerator release 403 when the accelerator is released. Therefore, the braking distance of the vehicle decreases as the target gain base value 410 increases. Here, the braking distance is a travel distance needed for the vehicle speed to be decelerated to a predetermined value.

The last value hold 111 calculates a target gain last value 411 as the last value of a target gain 401 (K).

The select-high 112 selects the larger of the target gain base value 410 input from the target gain calculation 310 and the target gain last value 411 input from the last value hold 111 to calculate a target gain change direction limiting value 412. Thus, the braking distance by the target gain change direction limiting value 412 is always shorter than the braking distance when the last value of the target gain 401 (K) is used.

The selector 113 outputs the target gain base value 410 as the target gain 401 (K) when a brake switch signal is OFF and the target gain change direction limiting value 412 as the target gain 401 (K) when the brake switch signal is ON after the brake switch signal is input from the brake switch 11, the target gain base value 410 is input from the target gain calculation 310, and the target gain change direction limiting value 412 is input from the select-high 112. When the brake switch is ON, the target gain 401 (K) changes such that the braking distance only decreases.

As described above, the target deceleration 201 changes such that the braking distance only decreases when the brake switch is ON and thus, changes of the target gain 401 (K) do not hinder the driver's brake operation.

A basic driving force calculation at accelerator release 311 calculates the basic driving force at accelerator release 402 by inputting a vehicle speed signal. The basic driving force at accelerator release 402 is, as shown in FIG. 10, a positive value corresponding to a creep when the vehicle speed is equal to a predetermined value or less. When the vehicle speed is equal to the predetermined value or more, the driving force is negative.

An integrating unit 312 calculates the driving force at accelerator release 403 by integrating the basic driving force at accelerator release 402 and the target gain 401 (K).

A deceleration conversion 313 calculates the target deceleration 201 (Gr) from the driving force at accelerator release 403 (Fc) as $Gr=\{Fc-M\sim g\cdot\mu-(\rho\cdot Cd\cdot A\cdot V^2)/2\}/M$.

In the target deceleration operation unit 101 according to the second embodiment, the driving force while regeneration is increased, that is, the driving force at accelerator release 403 is made K times the basic driving force at accelerator release 402 and thus, the creep can continuously be linked when the vehicle is decelerated. Also when regeneration is increased, the deceleration pattern is close to normal deceleration by an engine brake and thus, an uncomfortable feeling of the driver can be reduced and the driver's brake operation can be made easier.

REFERENCE SIGNS LIST

1 battery
2 motor
3 inverter power supply
4 reduction gear
5 differential mechanism
6 driving wheel
7 braking device
8 control operation unit
9 vehicle speed sensor
10 accelerator sensor
11 brake switch
12 external recognition sensor
13 brake pedal
99 target behavior operation unit
100 target driving torque operation unit
101 target deceleration operation unit
102 deceleration operation unit
103 target deceleration torque operation unit
104 control intervention arbitration unit
110 target deceleration calculation
111 last value hold
112 select-high
113 selector
120 torque converter
121 proportion operation
122 integral operation
198 target distance
199 target speed
200 target torque
201 target deceleration
202 deceleration
203 target deceleration torque
204 target torque
210 target deceleration base value
212 target deceleration change direction limiting value
220 target deceleration torque base value
221 deceleration deviation
222 proportion correction value
223 integral correction value
310 target gain calculation
311 basic driving force calculation at accelerator release
312 integrating unit
313 deceleration conversion
401 target gain
402 basic driving force at accelerator release
403 driving force at accelerator release
410 target gain base value
411 target gain last value
412 target gain change direction limiting value
701 signal
702, 703 vehicle
704 local vehicle
705 local vehicle

The invention claimed is:

1. A drive control device of a moving body that updates a regenerative pattern of a driving motor of the moving body including a brake that generates a braking force by being linked to an operation amount of a brake pedal, the drive control device comprising:
   an external information acquisition unit that acquires external information; and
   a brake detector that detects ON/OFF of the brake, wherein
      when the brake detector detects ON, the regenerative pattern is changed by increasing a regenerative force based on the external information acquired by the external information acquisition unit such that the braking force of the brake decreases while the regenerative force increases thereby improving fuel efficiency.

2. The drive control device of a moving body according to claim 1, wherein
   the external information is a type of a deceleration object, a relative distance, and a relative speed registered in advance.

3. The drive control device of a moving body according to claim 2, further comprising:
   a target behavior operation unit that calculates a target distance and a target speed of the moving body from the type, the relative distance, and the relative speed, wherein the regenerative pattern is changed such that a speed of the moving body at the target distance is the target speed.

4. The drive control device of a moving body according to claim 3, wherein
when the brake detector detects ON, torque of the driving motor is changed based on the external information such that deceleration of the moving body only increases.

5. The drive control device of a moving body according to claim 4, wherein
at least one of the deceleration objects is a preceding vehicle on a traveling route of the moving body.

6. The drive control device of a moving body according to claim 4, wherein
at least one of the deceleration objects is a red signal stop line on a traveling route of the moving body.

7. The drive control device of a moving body according to claim 4, wherein
at least one of the deceleration objects is a tollgate on a traveling route of the moving body.

8. The drive control device of a moving body according to claim 4, wherein
at least one of the deceleration objects is a road curve on a traveling route of the moving body.

9. The drive control device of a moving body according to claim 4, wherein
at least one of the deceleration objects is a width decreased portion on a traveling route of the moving body.

10. The drive control device of a moving body according to claim 4, wherein
at least one of the deceleration objects is a downhill grade on a traveling route of the moving body.

* * * * *